United States Patent [19]

Kelly et al.

[11] Patent Number: 4,748,066
[45] Date of Patent: May 31, 1988

[54] FIRE RESISTANT MATERIALS

[75] Inventors: Richard A. Kelly, Framingham, Mass.; Archibald L. Walker, Woodstock, Conn.

[73] Assignee: Digital Equipment Corporation, Maynard, Mass.

[21] Appl. No.: 11,418

[22] Filed: Feb. 3, 1987

Related U.S. Application Data

[63] Continuation of Ser. No. 666,787, Oct. 31, 1984, abandoned.

[51] Int. Cl.$^4$ ................................................ B32B 3/28
[52] U.S. Cl. .................................... 428/182; 156/210; 428/184; 428/186; 428/312.6; 428/920; 428/921
[58] Field of Search ............... 428/182, 184, 186, 921, 428/312.6, 920; 156/210; 52/232

[56] References Cited

U.S. PATENT DOCUMENTS

| | | | |
|---|---|---|---|
| Re. 22,842 | 2/1947 | Hill | 154/31 |
| 967,246 | 8/1910 | Sala . | |
| 2,347,419 | 4/1944 | Lander | 154/33.05 |
| 2,434,466 | 1/1948 | Marc | 428/186 |
| 2,551,919 | 7/1950 | Williamson et al. | 169/14 |
| 3,077,222 | 2/1963 | Shanley | 428/186 |
| 3,202,567 | 8/1965 | Mori | 428/920 |
| 3,259,536 | 7/1966 | Gaeth et al. | 428/289 |
| 3,290,205 | 12/1966 | Goldstein et al. | 428/186 |
| 3,676,247 | 7/1972 | Morris et al. | 156/205 |
| 3,707,385 | 12/1972 | Kraemer et al. | 106/15 FP |
| 4,086,116 | 4/1978 | Yazaki et al. | 156/205 |
| 4,122,203 | 10/1978 | Stahl | 428/921 |
| 4,140,564 | 2/1979 | Schrader | 156/205 |
| 4,278,486 | 7/1981 | Schrader | 156/231 |
| 4,284,445 | 8/1981 | Shimizu | 156/64 |
| 4,316,755 | 2/1982 | Flaumm et al. | 156/205 |
| 4,379,015 | 4/1983 | Ware et al. | 156/205 |
| 4,405,682 | 9/1983 | Fujita et al. | 428/920 |

FOREIGN PATENT DOCUMENTS 1084503 9/1967 United Kingdom ............... 428/920

Primary Examiner—Paul J. Thibodeau
Attorney, Agent, or Firm—Hayes, Davis & Soloway

[57] ABSTRACT

The production of fire resistant articles is described comprising a normally combustible carrier element having applied thereto sodium silicate which is heat foamable to produce a further element capable of resisting the passage of fire and/or heat therethrough in the event the article is exposed to fire and/or heat. In a typical embodiment the articles comprise corrugated container-wall structures, in which the sodium silicate layer serves as the fire and/or heat barrier, laminating adhesive, and provides structural strength.

42 Claims, 10 Drawing Sheets

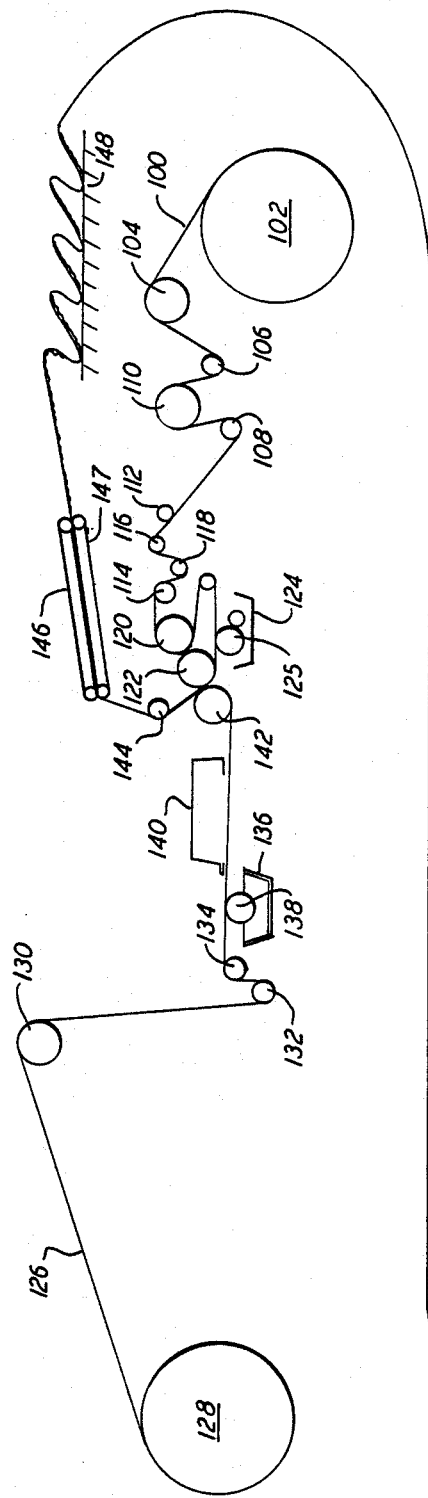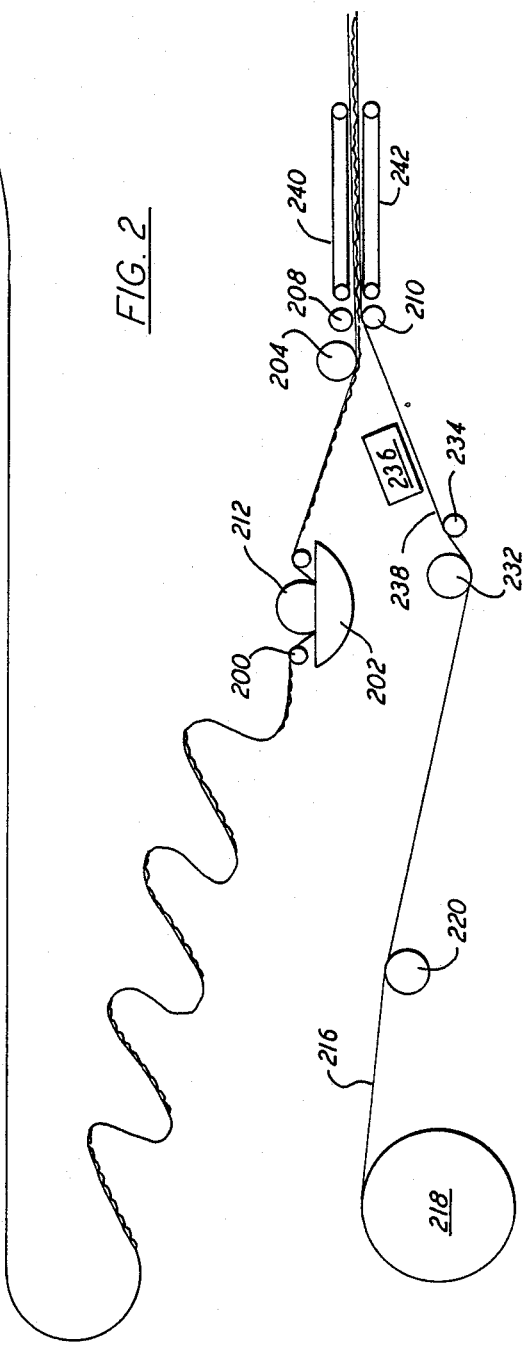
FIG. 2

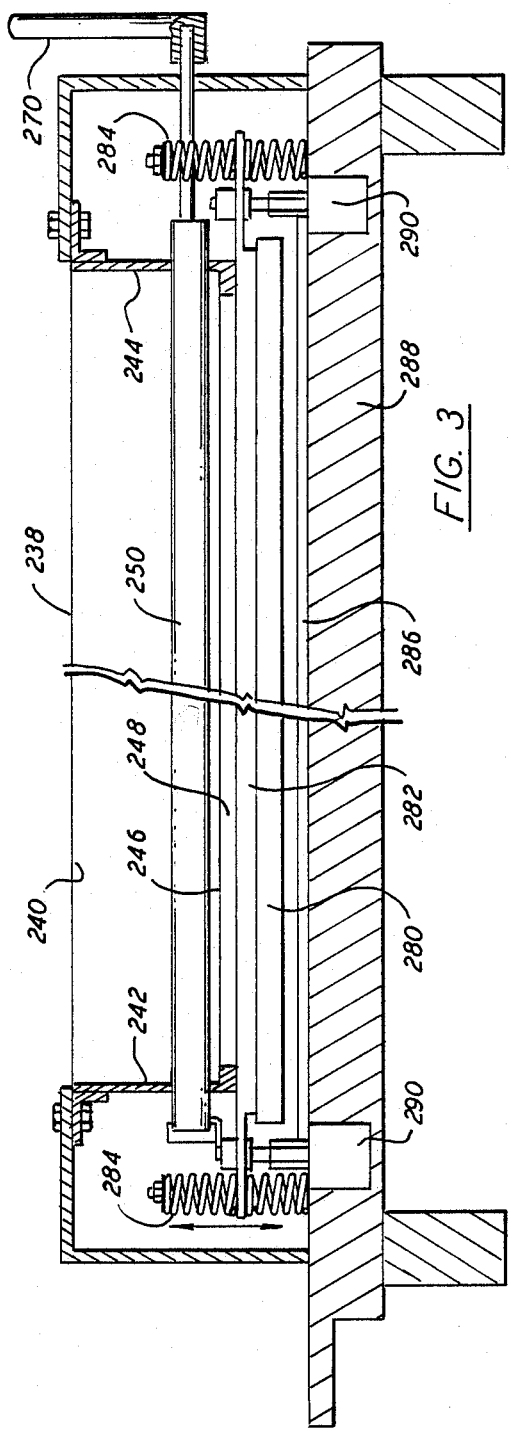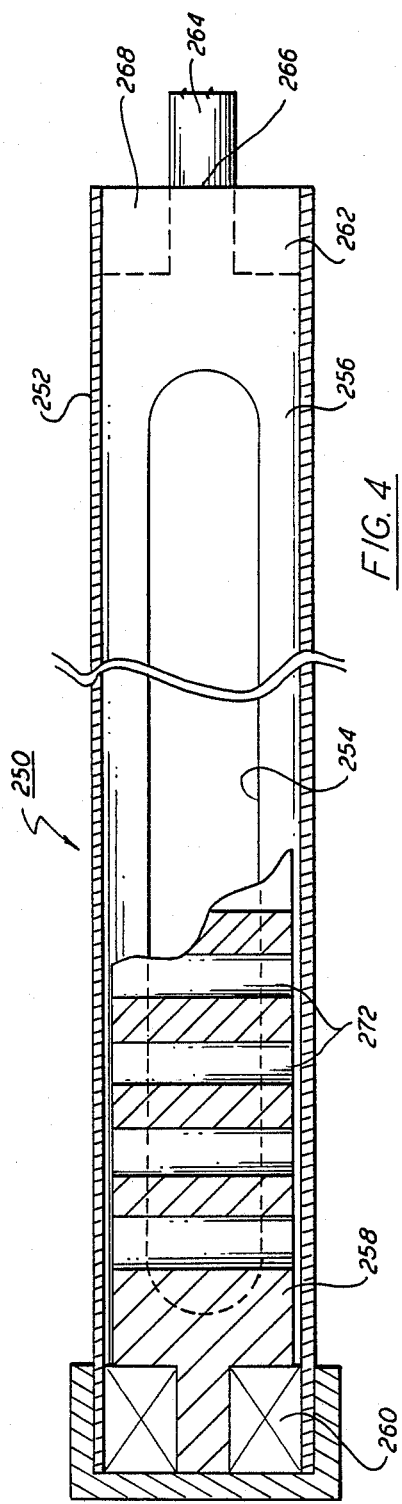

FIRE RESISTANT MATERIALS

This is a continuation of co-pending application Ser. No. 666,787 filed on Oct. 31, 1984, now abandoned.

The present invention relates generally to fire resistant products, and in particular to normally combustible materials having thereon a coating and/or impregnation which renders the materials fire resistant, and novel products made from such materials. The invention also contemplates a novel process for producing fire resistant otherwise combustible materials and products having the aforesaid characteristics, and to novel apparatus useful in the aforesaid process. The invention has particular utility in connection with the manufacture of fire resistant cellulose products such as corrugated structures, i.e., corrugated container wall materials (corrugated paperboard), and will be described in detail in connection with such utility. However, the invention is not limited to production of fire resistant corrugated container wall materials, as will become clear from the following description.

Systems currently in use for manufacturing corrugated structures typically employ fluting rollers for fluting a medium, generally paper drawn off of a first roll, to form a corrugated (fluted) layer. The fluting medium is passed through the fluting rollers, which generally are heated to temperatures above about 350° F., adhesive is applied to the crests of the flutes, and a liner board, generally paper drawn off of a second roll, is applied to form a single faced fluted structure. Typically the resulting single faced fluted structure then may be further processed in order to enhance the strength of the fluted structure by drawing a second liner board drawn off of a third roll over another preheating roller, and adhesively affixing a second liner board to the exposed crests of the flutes of the single faced fluted structure, whereby to form single wall corrugated structure. The single wall corrugated structure is then passed over a heated medium or hot plate section while subjected to pressure from a weight roller and belt assembly above the hot plate section.

The adhesive conventionally employed to bond the fluted medium to the liner boards is a so-called "Stein-Hall" starch-based adhesive, typically cornstarch, and containing formaldehyde as an anti-fungal agent, and caustic soda for pH adjustment. The starch-based adhesive also may contain borax or other tackifying agent to increase the tack of the adhesive (see U.S. Pat. Nos. 3,151,996 and 2,833,662). Due to its relatively short shelf-life, in order to prevent unwanted (premature) setting, the starch based adhesive ordinarily is cooked, i.e., batch-wise, by heating an aqueous slurry comprising a measured quantity of starch to gradually bring the temperature of the slurry to jellation temperature. Several processes also have been developed for cooking the starch slurry substantially instantaneously. (See U.S. Pat. Nos. 2,609,326, 2,717,213, 3,113,836, 3,228,781, 3,308,037 and 3,450,549.)

One problem in a conventional corrugating system is the occurrence of malformed flutes in the fluting medium. Malformed flutes may be formed during the initial fluting or may result during subsequent processing. The main processing areas at which deformation may occur are in the removal of the fluted medium from the fluting rollers, and in the hot plate (adhesive setting) section. Deformation during removal of the fluted medium from the fluting rollers results primarily from the inability of the fluted medium properly to release from the fluting rollers after application of heat and pressure in the nip of the rollers.

Deformation frequently also occurs in the hot plate section of a double backing operation, i.e., when the second liner board is adhesively applied to the crests of the exposed flutes of the single face corrugated structure, and the single wall corrugated structure is passed over a hot plate section with pressure applied from a belt and weight roller assembly above the hot plates in order to cure the adhesive and dry the corrugated structure. The high coefficient of friction between the hot plate section and the face of the liner board may result in deformed flutes (i.e. "fracture") or "leaning" as the single wall corrugated structure is subjected to shear forces between the belt and weight roller assembly and the hot plate section surfaces.

A high shear force in the single wall corrugated structure also may produce a loss of strength in the adhesive bond between the second liner board and the crests of the flutes of the single faced fluted structure. Typically, the adhesive bond for the second liner board may not be fully set so that when the single wall corrugated structure enters the hot plates, high shear forces therein can break the initial bond resulting in slippage between the second liner board and the single faced fluted structure.

The prior art has attempted to solve the flute deformation problems by preconditioning the fluting medium with steam, using a heated roll filled with steam with slots or outlets to release the steam across the width of the paper, and a top steam shower. The fibers of the paper become softened and pliable as a result of this steam treatment. The steam, however, is applied some distance (usually inches in most cases) before the paper enters the fluting rollers and therefore may not be entirely effective at the nip of the fluting rollers where the flutes are formed. Moreover, the steam treatment adds substantial energy requirements to the corrugating system both for the initial generation of the steam, and for subsequent heating of the resulting corrugated structure to dry the product.

Product loss also results from so-called "S-warp" and "blistering" which results from uneven cooling of the corrugated structure as the adhesive sets. Product loss from "S-warp" and "blistering" reportedly is a high as 5% to 9%.

One way in which to solve the problems of malformed or deformed flutes and "S-warp" is to run the corrugating system at a low rate of production. Thus, while modern corrugating equipment producing single face structure may have a throughput capacity in excess of 1,000 feet per minute, typically, corrugating equipment using Stein-Hall starch based adhesives reportedly may operate at throughput speeds of only about 200 to 350 feet per minute for producing single walled corrugated structure.

A number of investigators have proposed various solutions for increasing throughput speed in a corrugating system. For example, the prior art has attempted to solve the flute malformation problem by the use of various lubricants applied to the fluting medium and/or the fluting rollers. (See for example, U.S. Pat. Nos. 1,796,542, 3,676,247 and 3,103,459). The lubricants typically are of a hydrocarbon base such as a paraffin, wax or polyethylene, and may be applied in liquid form, or in solid bar form applied to the paper stock or to the crests of the fluting rollers. While these hydrocarbon base lubricants release the fluting medium from the fluting rollers, and thus reportedly result in some improvement in flute formation and somewhat higher operating speed, the use of such hydrocarbon base lubricants results in additional problems. For one, such lubricants have a tendency to be absorbed by the fluting medium and/or liner board resulting in the discoloration of the fluted medium and/or liner board. Such hydrocarbon base lubricants also tend to vaporize under operating temperatures of the fluting rollers and hot plates and the resulting hot oil vapors may produce unacceptable concentrations of hydrocarbons in the shop atmosphere. Moreover, these same hydrocarbon base lubricants also may increase the flammability of the resulting corrugated structure.

U.S. Pat. No. 3,676,247 to Andrew W. Morris and Reginald J. Norman discloses the manufacture of corrugated paperboard structures at ambient or intermediate temperatures (up to 320° F.) by treating both sides of a fluting medium, prior to corrugation, with a lubricant such as a mixture of stearates and paraffin wax. The treatment reportedly releases the fluting medium from the fluting rollers, whereby to permit running the fluting rollers at substantially higher speeds without the need for heating and/or steaming the fluting medium. Morris et al then apply a film of adhesive such as sodium silicate to the high points (crests) of the exposed flutes on one side of the fluted medium and secure a liner board to one side of the fluted medium, and a cold-set adhesive of the polyvinyl acetate type or of the polyvinyl alcohol type is then used for securing one or more additional liner boards to the other side of the resulting single faced fluted structure at intermediate or ambient temperatures. While the method of manufacturing corrugated paperboard structures described in the Morris et al patent reportedly eliminates many of the disadvantages of the hot process, including defects known in the trade as "washboarding", "S-warp", "blistering" and "interlift" of the liners together with "highlows", "leaning" and "fracture" of the flutes, the Morris et al process creates an extremely flammable end product due to the use of polyvinyl acetate or polyvinyl alcohol-type adhesives. Flammability problems exist in the manufacturing plant and may present an extreme danger.

A number of investigators have proposed various solutions for making corrugated container wall materials flame retardant or fire resistant. Such prior art investigators, however, have concentrated their efforts on modifying the "wet side" chemistry of the paper stock. While such prior art efforts have resulted in some reduction in flammability of the resulting corrugated container wall material, none of the prior art solutions is believed to have produced a truly fire resistant corrugated container wall materials. Moreover, the modification of the paper chemistry on the "wet side" has resulted in additional complications in the manufacturing process, since many of the flame retardant materials employed on the "wet side" chemistry are adversely affected by the high temperatures of the conventional corrugating system.

It is thus a primary object of the present invention to provide a method and means for rendering normally combustible materials fire resistant. Yet another object of the present invention is to provide new and improved fire resistant normally combustible products which overcome the aforesaid and other problems of the prior art. Another more specific object of the present invention are to provide new and improved corrugated structures, which structures are characterized by resistance to fire or heat, and low flame spread. Still other more specific objects of the present invention are to provide new and improved corrugated container wall materials which exhibit good mechanical properties, and resistance to fire or heat, and which corrugated container wall materials may be economically manufactured using existing equipment with only minor (lost cost) modification, and at reduced energy costs and increased yields, and to provide novel processes for producing corrugated container wall materials having the aforesaid characteristics, and apparatus for practicing such processes.

The invention accordingly comprises the processes involving the several steps and relative orders of one or more of such steps with respect to each other, and the materials, apparatus and products possessing the features, properties and relations of elements which are exemplified in the following detailed disclosure and the scope of application of which will be indicated in the claims.

Generally, in the practice of this invention, new fire resistant products are provided comprising a normally combustible carrier or substrate having applied thereto a sodium silicate which is heat-foamable to produce an element capable of resisting the passage of fire therethrough in the event said material is exposed to fire or heat. The sodium silicate acts as an intumescent material, which, upon exposure to heat or fire, forms a mechanically stable foam which acts (a) as an oxygen denial barrier, and (b) a heat reradiator and/or thermal insulator reradiator. The foam also limits the fuel vapor generation rate of the normally combustible carrier or substrate whereby to prevent combustion of the carrier or substrate. In a typical embodiment of the invention, the normally combustible substrate comprises a laminated paper product in which the sodium silicate also functions as the laminating adhesive. In such embodiment the sodium silicate typically will be applied in an amount (dry) of at least about three pounds per thousand square feet of the paper product. If desired, one or more compatible substances such as, for example, dyes, wetting agents, surfactants, dispersants, fungicides, bactericides, extenders, etc. may be added to the sodium silicate. The fire resistant products are prepared by applying to the normally combustible carrier or substrate suffcent sodium silicate to provide the desired intumescence. In the case of laminated paper product the sodium silicate is applied to one or both paper elements to be laminated, the elements are then pressed into adhering contact with the sodium silicate between them, and the sodium silicate permitted to set. In an especially typical embodiment of the invention the fire resistant normally combustible product comprises a corrugated container wall material (corrugated paperboard), and the sodium silicate is the sole adhesive employed for laminating the various fluting media and liner boards.

Still other objects in any of the advantages of the present invention will become clear from the following description taken in connection with the accompanying drawings wherein like numerals denote like elements, and:

FIG. 2 is a fragmentary side elevational view of an apparatus for manufacturing fire resistant corrugated container wall materials in accordance with the present invention;

FIG. 3 is a side elevational view of the coater/pressure impregnator portion of the apparatus of FIG. 2 taken through lines 3—3 of FIG. 2;

FIG. 4 is a bottom view, in partial cross section, showing details of the valve and valve housing of the coated pressure impregnator of FIG. 3;

In the following detailed description of the present invention, the terms "carrier" or "substrate" are to be understood as referring to mechanical support structures. The terms "laminated product" and "laminate" are to be understood as referring to a structure consisting of at least one base layer having at least one additional layer adhesively affixed thereto. The layers may consist of flat stock, or one or more of the layers may comprise a fluted medium as in the case of corrugated container wall materials. The term "intumescence" refers to the property of a material to swell or foam when exposed to high temperature or fire. The term "compatible" as used in connection with the substances added to the sodium silicate are to be understood as referring to those substances which enhance handling characteristics, adhesive characteristics and/or fire resistant characteristics of the sodium silicate, all as will be described in detail hereinafter. And, the terms "corrugated" and "corrugating" may be used interchangeably with the terms "fluted" and "fluting", respectively, as is conventional in the art.

As noted supra the use of sodium silicate as an adhesive for corrugated paperboard structure has previously been investigated as taught by Morris et al U.S. Pat. No. 3,676,247. However, Morris et al apply a film of sodium silicate adhesive only to the high points (crests) of the exposed flutes one side of the fluted medium with the result that the sodium silicate film is largelly discontinuous, and the sodium silicate applied to the laminated product is present in quite small amounts. And as noted supra, for securing the other liner boards to the resulting single faced fluted structure, Morris et al employ polyvinyl acetate or polyvinyl alcohol type adhesives which present severe flammability problems during manufacturing, and increase substantially the flammability of the resulting corrugated structure. The present invention is based in part on the discovery that sodium silicate, when applied to a normally flammable laminated product in sufficient quantities provides the dual functions of (1) strong adhesive strength and (2) fire resistance.

Figure 1:
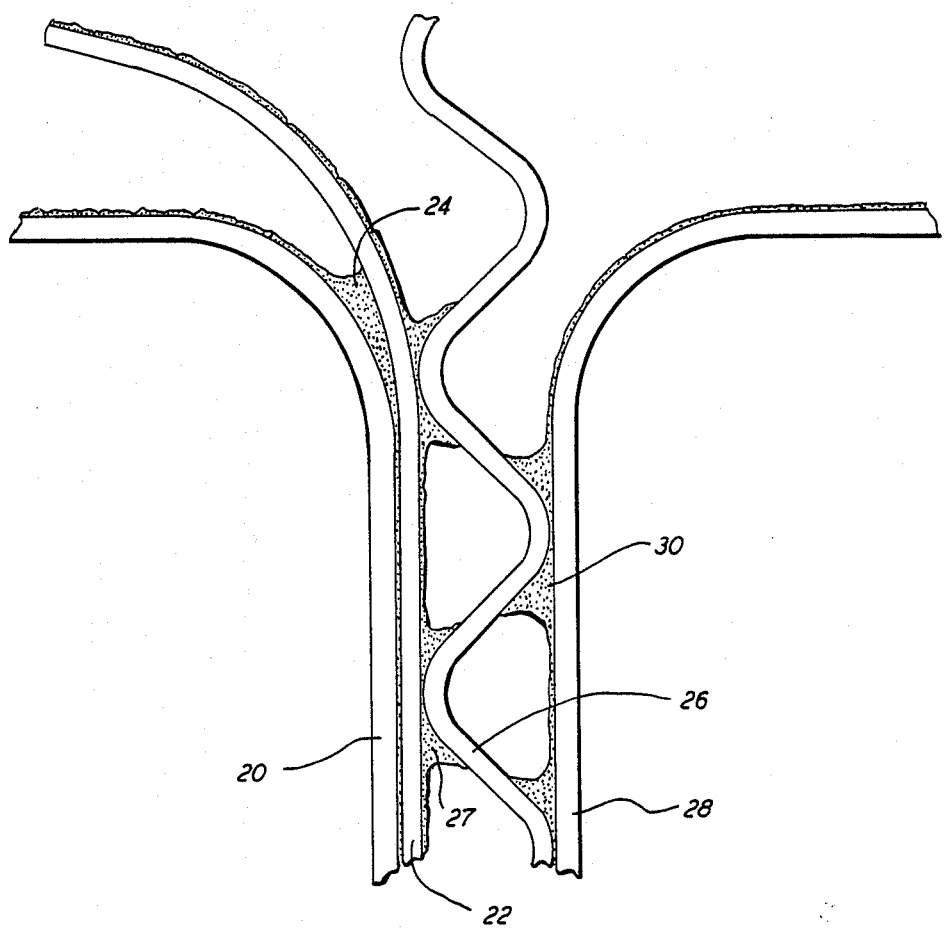
FIG. 1 is a fragmentary prospective view of a fire resistant product in the form of corrugated container wall materials produced in accordance with the present invention.

One embodiment of this invention is shown in FIG. 1 of the drawings. Referring to FIG. 1 of the drawings, a corrugated container wall material is shown having an external wall comprising a laminate of two liner board layers 20 and 22. Layers 20 and 22 comprise conventional flat liner board stock, typically a basic kraft paper stock or the like. Layers 20 and 22 are laminated to one another by a sodium silicate adhesive 24 which typically is applied in an amount (dry weight) of about three to about sixty pounds per thousand square feet of liner board stock, typically about three to about twenty-four pounds per thousand square feet, most typically about three to about nine pounds per thousand square feet of liner board stock. Layer 22 in turn is adhesively affixed to a paperboard fluting medium 26 by means of a second layer 27 of sodium silicate adhesive typically applied in an amount (dry weight) of about three to about sixty pounds per thousand square feet, of corrugating medium, typically about three to about twenty-four pounds per thousand square feet, most typically about three to about nine pounds per thousand square feet of liner board stock. A third flat liner board stock layer 28 is affixed to the other side of fluting medium 26 by means of a sodium silicate adhesive 30 applied in an amount (dry weight) in the range of about three to about sixty pounds per thousand square feet, typically about three to about twenty-four pounds per thousand square feet, most typically about three to about nine pounds per thousand square feet of liner board stock. For use in making a box or like container, the laminate of layers 20 and 22 typically will be formed as the external layer of the box, while liner board layer 28 will be the internal layer. Boxes made from the corrugated container wall materials of the present invention are thermally reactive. When subjected to heat or flame, some combustion is required to generate fire resistance.

The sodium silicate material may consist solely of liquid sodium silicate solution (water glass) as is available commercially from a number of manufactures. In the current practice of the present invention liquid sodium silicates available from Diamond Shamrock Company, and having solid contents of between about 37.9% and 48.0% have been advantageously employed. Generally, the sodium silicate is employed as it comes from the manufacturer. While a small amount of water may be added to reduce the viscosity of the liquid sodium silicate solution for certain applications, dilution generally is not recommended since the added water increases the cure time of the applied sodium silicate material.

The degree of fire resistance achieved in the present invention appears to depend primarily on the amount of sodium silicate applied to the combustible carrier or substrate material. Acceptable fire resistance may be imparted to paper products by the application of as little as three pounds (dry weight) per thousand square feet of product, and fire resistance increases with the amount of sodium silicate applied to the product up to about sixty pounds (dry weight) per thousand square feet of product. Applciation of sodium silicate in an amount in excess of about sixty pounds (dry weight) per thousand square feet of product typically does not appear to materially further improve fire resistance (or adhesive strength). However, fire resistance can be increased by the inclusion of additional layers of sodium silicate carrying laminates.

If desired one or more compatible inorganic oxides or salts, as will be described in detail hereinafter, may be blended with the sodium material to modify certain handling characteristics of the sodium slicate and/or further enhance fire resistance and/or mechanical properties, e.g. strength of the resulting material.

While not wishing to be bound to theory, it is believed that sodium silicate provides two separate mechanisms in sequence for resisting fire. Upon first exposure to high temperature the sodium silicate coating undergoes detachment of bound water molecules in the form of water vapor. The release of the water molecules and production of water vapor acts to remove incident heat from the surface of the corrugated container wall material whereby to generate a thermal lag and thus protect the otherwise combustible substrate and the contents of the box formed from the corrugated container wall material for a period of time. This water molecular depletion mechanism tends also to maintain the corrugated container wall material at a somewhat constant temperature until the sodium silicate core material becomes substantially depleted of water molecules. Following release of the bound water molecules, the sodium silicate then undergoes intumescence, forming a mechanically stable foam consisting of the inorganic silicate. The resulting foam serves as an oxygen denial barrier and heat reflector or reradiator providing further protection of the otherwise combustible substrate and of objects contained within the box formed from the corrugated container wall material. The foam, which is non-combustible, also inhibits pyrolytic degradation of the cellulose fibers of the paper stock, and if present in sufficient quantity thermally insulates the box and contents so as to limit the fuel vapor generation rate of the combustible materials of the box (and contents). It has been observed that the silicate protective foam may not prevent the cellulose fibers themselves from undergoing thermal decomposition and subsequent generation of combustible gases. However, under ordinary fire conditions, the rate at which the fibers decompose when protected by the silicate foam typically is insufficient to generate combustible gases in a sufficient quantity to form a sustaining combustible mixture at normal oxygen levels. It has been observed that the material of the present invention is self-extinguishing with the removal of external fire sources. Thus, following exposure to fire, a box or container made from corrugated container wall material in accordance with the present invention may have the appearance of a charred substance. However, the box or container still may be intact and the contents of the box may be protected from fire. As a result boxes or containers formed from corrugated container wall material made in accordance with the present invention may be subjected to higher thermal flux for a longer period of time than conventional boxes or containers made from conventional corrugated container wall materials using conventional paper stock and adhesives. This added margin of time safety typically will permit dousing of fires, e.g. through automatic sprinkling systems or the like. Moreover, inasmuch as the corrugated container wall material itself is fire resistant, it will reduce propagation of the fire as in the case of conventional boxes or containers made from conventional corregated container wall materials using paper stock and adhesives.

One method and apparatus for producing corrugated container wall materials in accordance with the present invention is shown in FIGS. 2 to 5. Referring in particular to FIG. 2, a paperboard web 100 from which the fluting medium is formed is carried from a roll 102 from which it is drawn, over a guide roller 104, tensioning rollers 106 and 108 and a conditioning roller 110 for conditioning the web preparatory to fluting. The web is then passed between guide rollers 112 and 114 under tensioning rollers 116 and 118 to the fluting rollers 120 and 122. Fluting rollers 120 and 122 have intermeshing ribs or teeth to form flutes in the web. The first fluting roller 120 may be heated e.g. by means of steam, e.g. to a temperature in the range of 125° F. to 150° F. to facilitate formation of the flutes. However, unlike prior art practices, the second fluting roller 122 may be left at ambient temperature or may be cooled, e.g. as by circulating water, for reasons as will be explained hereinafter. Located in association with the second fluting roller 122 is an applicator mechanism indicated generally at 124 by which sodium silicate may be applied, for example, by means of a glue roll applicator 125, to the crests of the flutes of fluted web 100 for bonding a liner board sheet 126 to one side thereof. In order to facilitate handling, the sodium silicate adhesive typically will be heated by means (not shown) to a temperature above ambient but below its crystallization temperature (157° F.).

Liner board 126 is also in the form of a paperboard web wound in a roll 128 and is carried over a guide roller 130 and tension rollers 132 and 134 through an adhesive application system indicated generally at 136, wherein sodium silicate is applied to the underside of the liner board material 126. The sodium silicate application system 136 is of conventional construction known per se in the art and may comprise a Gravure roller 138. It is to be understood, however, that sodium silicate application system 136 may comprise other types of construction consistent with the handling of sodium silicate, for example, a trough applicator, wave applicator, foam applicator or the like. The sodium silicate coated liner board 126 then may be passed through an ambient air circulator shroud 140 wherein the sodium silicate coating is dried to tack, and the liner board then is passed under pressure guide roller 142 which may be water cooled and which presses the liner board into binding contact with the adhesive on the crests of the flutes. There results a single faced fluted structure comprising fluted web 100 and laminated liner board 126 which is then passed over guide rollers 144 and between the nip of nip point rollers and tractor belts 146 and 147 to a bridge conveyor 148 which serves as a buffer for differences between the operational speed of the single facer apparatus just described and a subsequent double backer apparatus as will be described in detail hereinafter.

The resulting single faced fluted structure is then passed over a guide roller 200 and into and through a sodium silicate adhesive roll applicator 202 wherein a film of sodium silicate is applied to the exposed crests of the flutes. The sodium silicate coated single faced fluted structure is then withdrawn from applicator 202 and passed under a guide roller 204 between opposed guide rollers 208, 210, for mating with a second (bottom) liner board 216. Roll 212 opposed to applicator 202 is used to maintain the fluted structure in contact with the adhesive roll applicator 202. At the same time, liner board 216 from a supply roll 218 is passed over a guide rollers 220, 232 and 234 to a coater/pressure impregnator station 236 as will be described in detail hereinafter, wherein sodium silicate is applied to the top side 238 of liner board 216.

At this point, the liner board 216 is integrally bonded to the single faced fluted structure by passing the sheets between the nip of nip point rollers and tractor belts 240 and 242 whereby to form single wall corrugated product. Subsequently, if desired, additional liner boards may be laminated to one another in place of the liner board 216 and 126 resulting in single wall corrugated product with multiple sodium silicate coated liner board. The fluting medium 100 may be multiple layer stock also. Using multiple layer stock with multiple sodium silicate layers increases the fire resistance as well as the strength of the finished product. In order to maximize penetration of the sodium silicate into the liner board stock, the liner board stock typically comprises saturating stock having a moisture content of two to nine percent.

As noted supra, the degree of fire resistance achieved in the present invention appears to depend primarily from the amount of sodium silicate applied to the combustible carrier or substrate material. Accordingly, while not necessary for successful practice of the present invention, it is typical that the sodium silicate be applied to the combustible carrier or substrate material so as at least partially to penetrate the surface of the carrier or substrate whereby to impregnate the carrier or substrate material. Due to its relative high viscosity it is somewhat difficult to achieve substantial penetration or impregnation of sodium silicate into many common carrier or substrate materials. While the viscosity of sodium silicate may be lowered and thus its penetration or impregnation rate enhanced by dilution with water, as noted supra dilution with water generally is not recommended since the added water increases the cure time of the applied sodium silicate.

Figure 5:
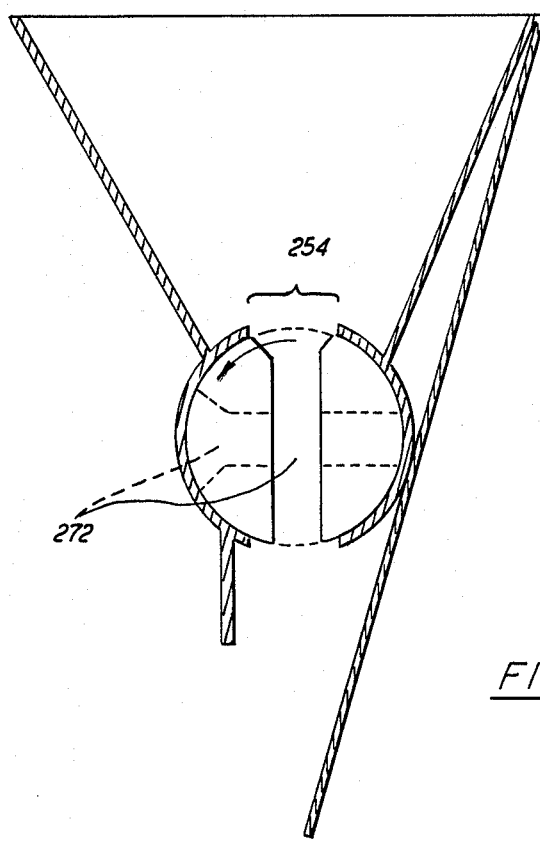
FIG. 5 is an end view showing details of the valve and valve housing of FIG. 4.

Referring in particular to FIGS. 3 and 5, there is shown one embodiment of coater/pressure impregnator station particularly adapted for coating and impregnating undulated sodium silicate into the surface of a carrier or substrate material in accordance with the present invention. The coater/pressure impregnator station 236 comprises a liquid distribution system having a liquid reservoir tank in the form of an elongated housing or enclosure 238 having a closed top 240, closed side and end walls 242 and 244, and a bottom wall 246 having an elongated slot 248. An elongated valve assembly 250 is mounted onto the bottom of tank 238 in fluid communication therewith for controlling withdrawal of liquid from the tank. Elongated valve assembly 250 comprises an elongated valve housing 252 having elongated slot 254 formed in the housing top and bottom walls, only one of which 256 is shown. An elongated valve core 258 having a plurality of passages 272 therethrough is mounted in the elongated valve housing 252, in a pair of bushings, 260 and 262, contained within the elongated housing. One end 264 of the valve core extends as through an orifice 266 in the valve side wall 268 and is fixed to a handle member 270. Thus, the valve core 258 is mounted for rotation within the valve housing 252 and may be adjusted by rotating handle member 270.

Mounted immediately below and in fluid communication with the valve assembly 250 is a Meyer rod 280 and Meyer rod frame assembly 282. Meyer rod frame assembly member 282 is mounted on a pair of spring assemblies 284 for reasons as will be explained hereinafter. A pressure pad 286, mounted on a base plate 288, is disposed immediately below Meyer rod 282. Base plate 288 is fixedly mounted in stationary position by means not shown. Completing the coater/impregnator station are a pair of pneumatic control cylinders 290 and controls (not shown) for selectively vertically positioning the Meyer rod frame assembly 282 and the attached Meyer rod 280 relative to the pressure pad 286.

In operation the amount of sodium silicate applied to the carrier or substrate and the degree of penetration therein can be adjusted by controlling the flow of sodium silicate through the valve, and by adjusting the pressure of Meyer rod 280 relative to pressure pad 286.

While the above described coater/pressure impregnator station 236 is particularly useful for applying (and impregnating) a substantially uniform coating of sodium silicate onto the top side surface of a moving web (i.e. the second liner board) in accordance with the present invention, it will be understood that other means may be employed for applying the sodium silicate material to the top side surface of the second liner board. For example, by suitably positioning the second liner board supply roll, the liner board may be withdrawn from the roll, coated with sodium silicate on its bottom side, e.g., as by passing through a trough applicator containing sodium silicate, and then passed over a reversing roller for lamination with the single faced fluted structure. (as used herein the terms "adhere" and "adhesion" will be understood to mean "adhesion and/or lamination.") Alternatively, the sodium silicate adhesive may be applied to the top side surface of the second lining sheet by means of a conventional knife coater or the like.

The resulting single wall corrugated structure may then be further treated by application of sodium silicate to one or both exterior surfaces if increased fire resistance is desired. The resulting corrugated product may be processed into finished products such as boxes.

Figure 6:
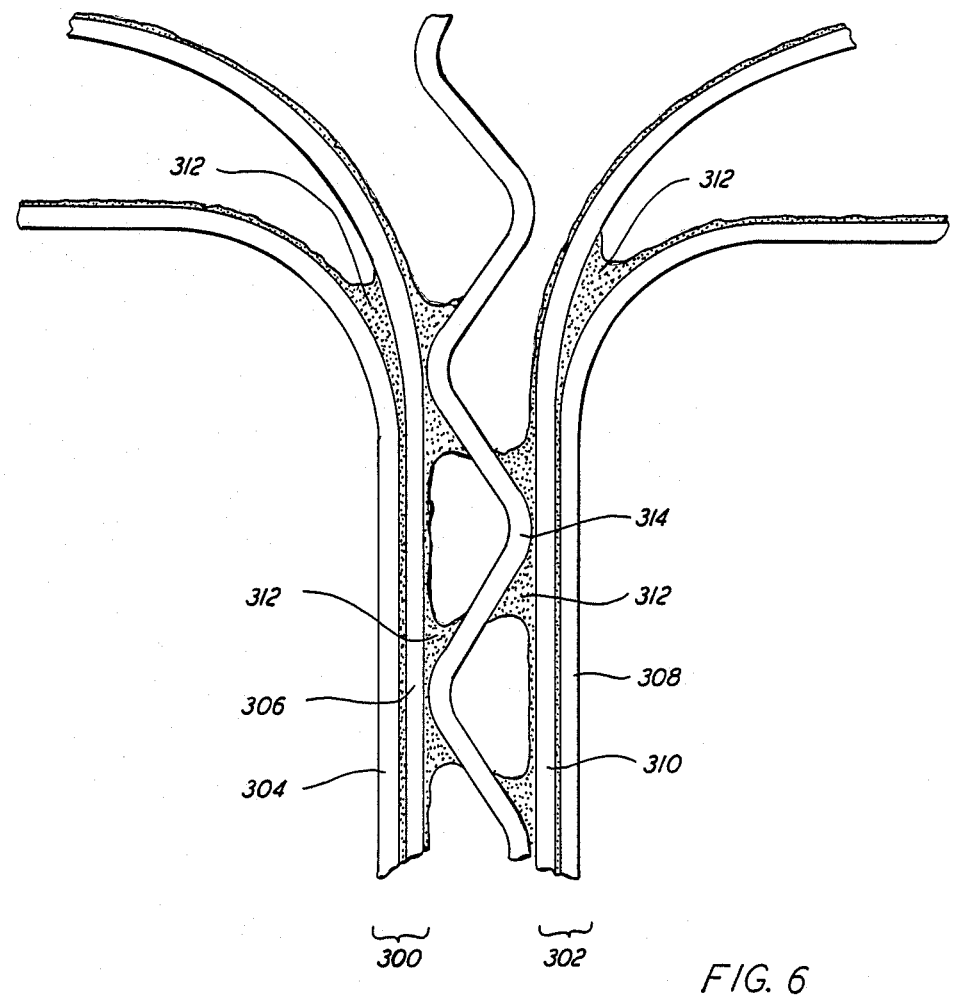
FIGS. 6 to 11 are cross-sectional views of yet other embodiments of fire resistant corrugated container wall materials made in accordance with the present invention.

Other structural designs of laminated paper paper products made in accordance with the present invention are shown in FIGS. 6-11. Referring in particular to FIG. 6, there is shown a corrugated laminate structure consisting of a double external liner board assembly 300 and double internal liner board assembly 302 consisting of first and second external liner boards 304 and 306 and first and second internal liner boards 308 and 310 laminated together by means of sodium silicate 312 in accordance with the present invention. The double external liner board assembly 300 and double internal liner board assembly 302 in turn are adhesively laminated to a (fluted) medium 314 using sodium silicate as above described. It will be seen that the double external liner board assembly and double internal liner board assembly construction as shown in FIG. 6 provides increased structural strength, and increased fire resistance due to the additional loading of sodium silicate which is available for water vapor generation and intumescence.

Figure 7:
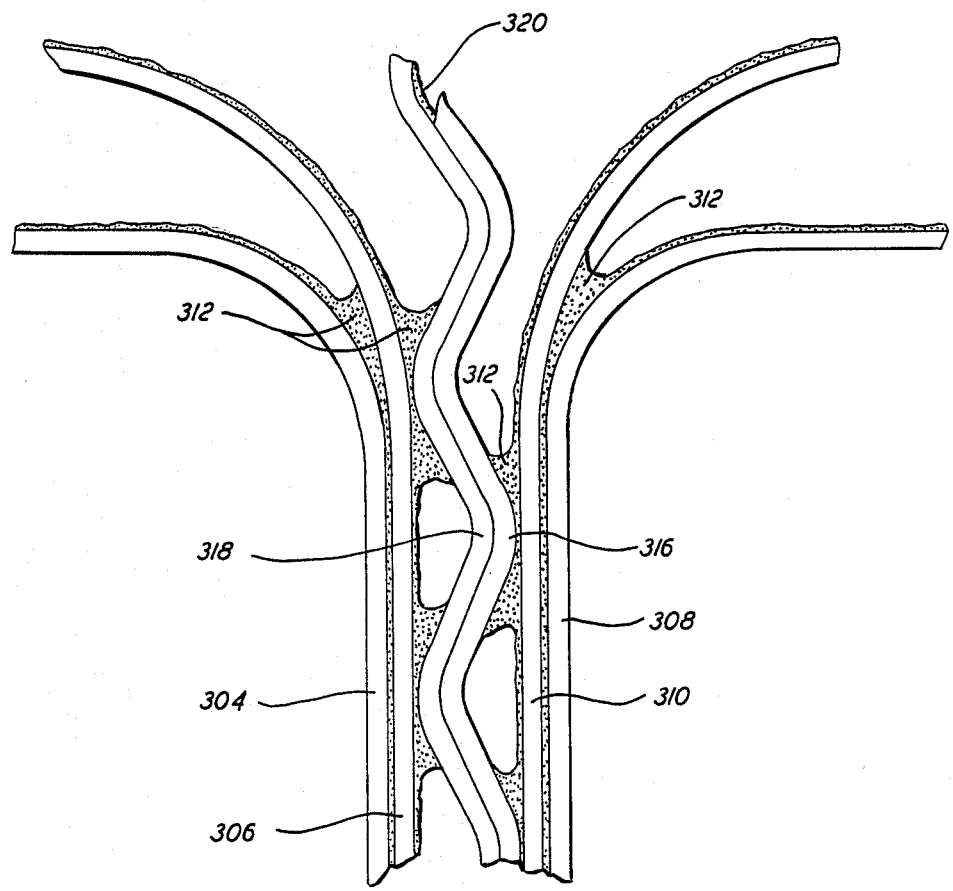

FIG. 7 shows yet another laminated corrugated structure made in accordance with the invention. The FIG. 7 construction is similar to that shown in FIG. 6, except in the FIG. 7 construction, the fluted medium comprises two fluted elements 316, 318 laminated to one another using sodium silicate 320. The corrugated structure shown in FIG. 7 provides additional structural strength and fire resistance.

Figure 8:
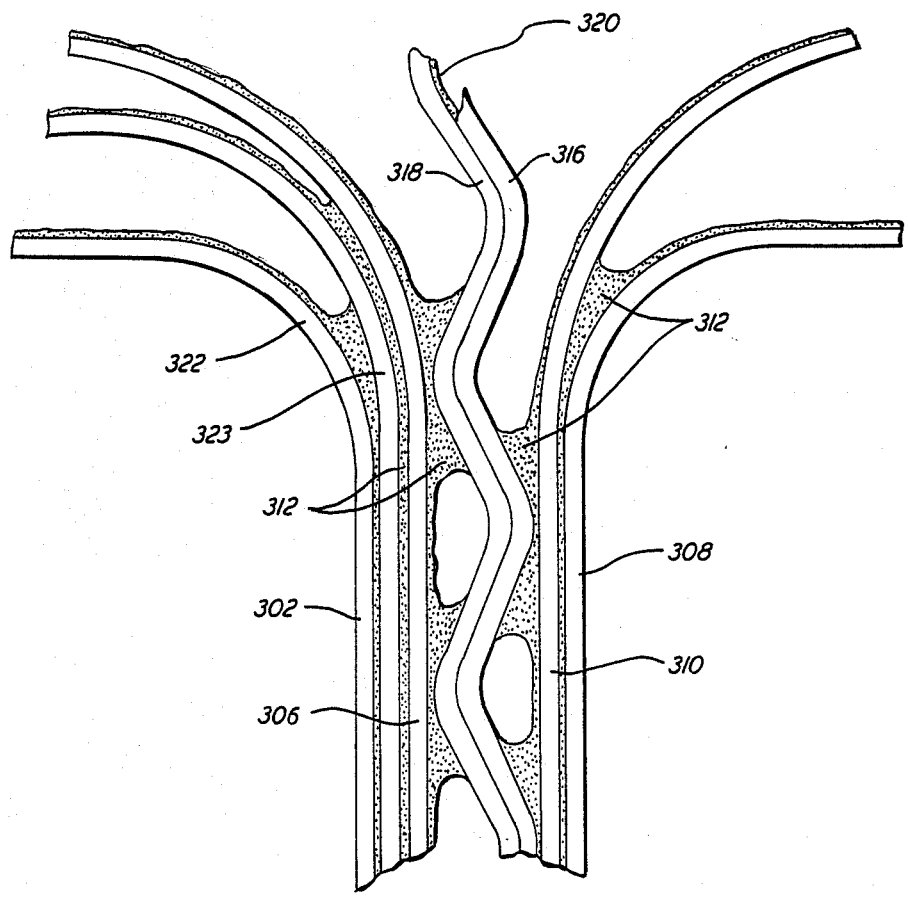

Yet another form of corrugated structure is shown in FIG. 8. The FIG. 8 product is similar to the FIG. 7 product, except that in the FIG. 8 product a third liner board 322 is adhesively affixed to one side of the structure by means of sodium silicate 323. The resulting corrugated structure provides yet additional structural strength and fire resistance.

Figure 9:
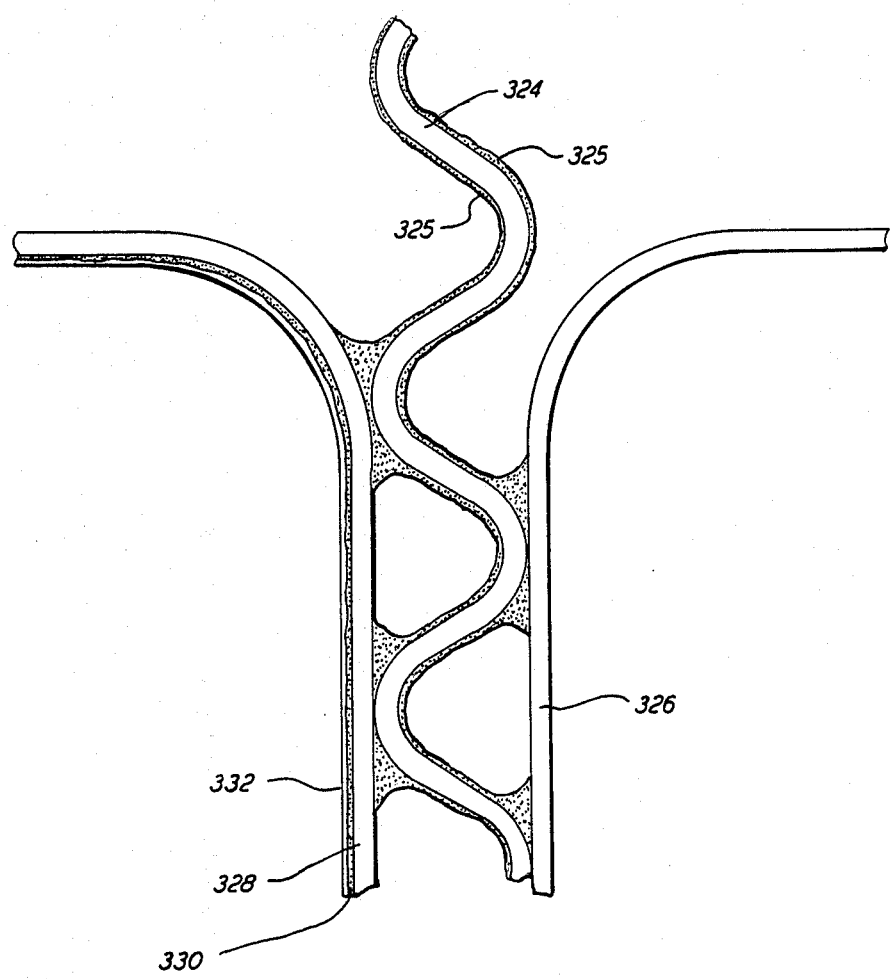

FIG. 9 shows yet another embodiment of corrugated structure made in accordance with the present invention. The FIG. 9 corrugated structure comprises a a single fluted medium 324 which is coated on both sides with a coating 325 of sodium silicate in accordance with the present invention. The single fluted medium 324 is adhesively fixed to a single internal liner board 326 and a single external liner board 328. As before, the adhesive comprises sodium silicate. The corrugated structure as just described has adequate structural strength and moderate fire resistance for many applications. Optionally, however, in order to increase fire resistance, an additional layer or coating 330 of sodium silicate may be applied to the exterior surface of liner board 328, and coating 330 in turn may be covered by a kraft sheet or other decorative sheet 332 which is adhesively bonded to the structure by means of the sodium silicate layer 330.

Figure 10:
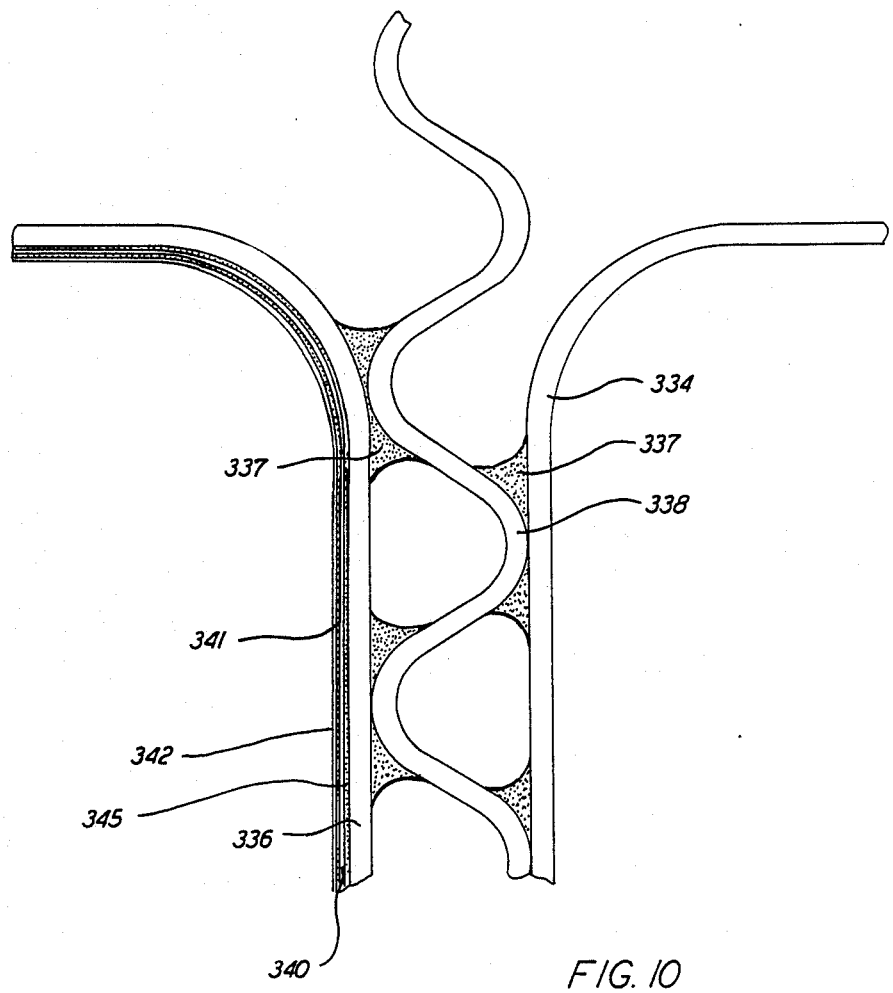

Yet another embodiment of the invention is shown in FIG. 10. The basic corrugated structure comprises interior and exterior liner boards 334 and 336, respectively, adhesively bound as before by sodium silicate 337 to a fluted medium 338. A graphite felt layer 340 is laminated to the outer surface of exterior liner board 336 by means of a sodium silicate layer 345, and a kraft paper sheet or other decorative covering 342 is adhesively affixed to the graphite felt layer 340 by means of a sodium silicate layer 345. The resulting corrugated structure may then be employed to fabricate boxes or other containers, the graphite felt layer of the resulting boxes providing electrical shielding protection to the contents of the box.

While sodium silicate above described may be employed as the combination adhesive and fire and/or heat barrier in accordance with the present invention, certain compatible inorganic materials may be added to the sodium silicate to further enhance handling characteristics of the sodium silicate, and/or mechanical properties and/or fire and heat resistance of the resulting product. The additives should be soluble in, miscible with, or suspended in the sodium silicate solution, and should be non-reactive with sodium silicate, or, if reactive with the sodium silicate, the resulting reaction product(s) should be intumescent. A typical additive which satisfies the aforesaid criteria is fumed silica. The addition of fumed silica to the sodium silicate increases the crystallization temperature of the sodium silicate and the fire resistance (combustion temperature) of products produced therefrom. Other inorganic salts and oxides, such as ferric oxide, titanium oxide, aluminum trihydrate, sodium aluminum sulfosilicate, antimony trioxide and antimony pentoxide, mica, a carbon material such as carbon black or graphite and mixtures of one or more of the foregoing which are given as exemplary, satisfy some or all of the aforesaid criteria and are useful in accordance with the present invention. Application of minute quantities of ethylene glycol in solution to standard kraft paper stock also increases the penetration rate of the sodium silicate into the paper stock, and may advantageously modify the evolution rate of water vapor from the sodium silicate. In one embodiment, the ethylene glycol is applied to the paper stock in a water solution of approximately one to five volume percent of the ethylene glycol. Ferric oxide also may enhance the bonding strength characteristics of the sodium silicate. Compatible surfactants also may be advantageously employed in the practice of the present invention. One such compatible surfactant is SPAN, which is available from ICI, United States. The manufacturer describes SPAN as comprising a fatty acid partial ester of sorbitol. Other compatible materials which may be advantageously employed in combination with the sodium silicate readily may be identified by one skilled in the art following the aforesaid teachings of the present invention.

The use of sodium silicate as an adhesive for corrugated structures in accordance with the present invention offers many advantages over the prior art, some of which are summarized below, as follows:

The manufacturing process is safe, i.e., the sodium silicate is non-flammable, and the process at least substantially reduces energy for costly heating, curing and drying steps for the adhesive as in the case of prior art systems using conventional aqueous based starch (Stein-Hall) adhesives. Thus, the invention may be practiced with only relatively low cost modification of existing equipment. Typically, the cost of modifying existing equipment will be recovered in energy savings in a short time period. Moreover, certain heating rollers, heating plates, etc. used for manufacturing corrugated structures using conventional Stein-Hall adhesives, i.e. in accordance with the prior art may be omitted, resulting in an overall reduction of the size of the plant, and reduced energy requirements of the plant. Also, the manufacturing procedure is somewhat simplified as compared with conventional processes, through-put may be increased, and curing time may be shortened as compared with conventional procedures.

Additionally, many of the product defects inherent in using heating plates and heating rollers, such as "S-warp", "blistering", "high-lows", "washboarding", "interlift" and "fracture" may be eliminated. Thus, defect rate may be lower, and process yield higher using the process of the present invention.

Moreover, corrugated structures made in accordance with the present invention are fire-resistant in a heat or flame environment up to 40 KW/M$^2$, and laminated products of the present invention may have increased structural strength and flexiblity over corrugated structures made from similar paper stocks and conventional Stein-Hall adhesives. Moreover, fire resistance may not be adversely affected by flexure of the products of the present invention.

Figure 12:
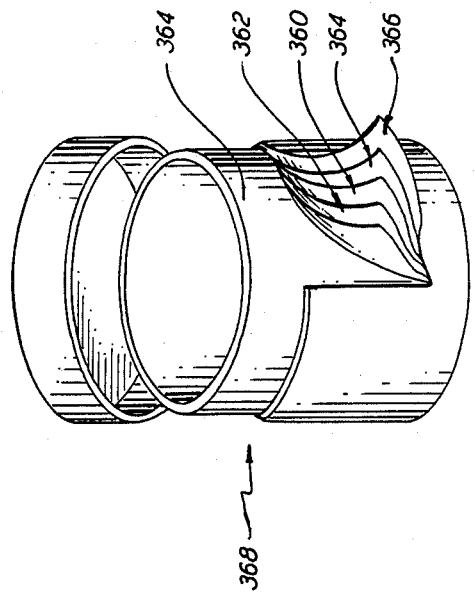
FIG. 12 is a fragmentary perspective view showing yet another embodiment of fire resistant structure made in accordance with the present invention.
Figure 11:
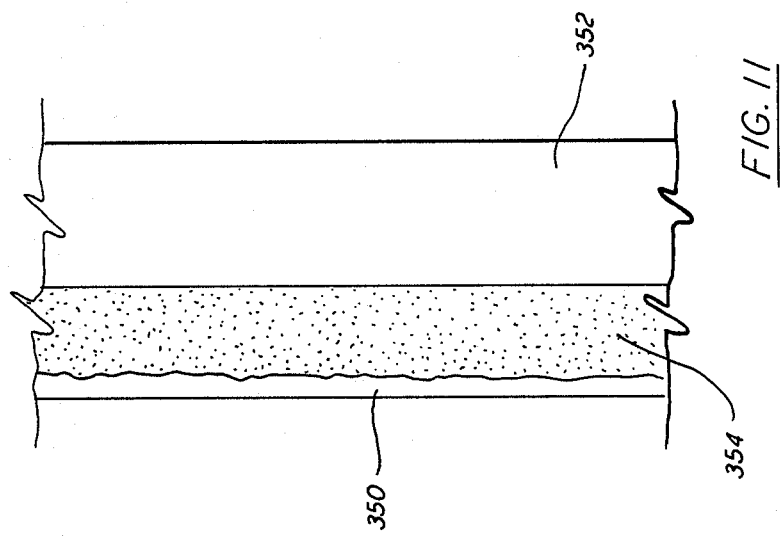

Certain changes will be obvious to one skilled in the art, and may be made in the above disclosure without departing from the scope of the invention here involved. For example, as shown in FIG. 11, the teachings and advantages of the present invention may be advantageously employed to produce fire resistant flat sheet product in which a decorative (sacrificial) kraft paper 350 is adhesively affixed to a paper board substrate 352 using sodium silicate adhesive 354 in accordance with the present invention. Such product may be used for certain light demand packaging needs. Fire resistant laminate decorative papers such as wrapping papers and wallpaper similarly may be produced. Alternatively, the sodium silicate may be applied directly to the combustible carrier or substrate as the top corrugating/impregnating coating. In such case it may be desirable to include a compatible dye or colorant in the sodium silicate. The sodium silicate also may be employed for producing laminated building products such as roofing materials, plasterboard or paneling, or for facing rigid insulation so as to increase the fire resistance of the roofing materials, plasterboard, paneling or insulation. And, as shown in FIG. 12, where electrical shielding also is desired, a grpahite felt layer 360 may be adhesively affixed via sodium silicate layer 362 to a paper board stock 364, and the graphite felt layer 360 in turn covered with an paper fascia layer 366 adhesively bound by a sodium silicate layer 364. The resulting laminate may be formed into a cylindrically shaped electrically shielded container 368 for protecting objects such as computer tapes or the like.

While the sodium silicate has been illustrated as being applied to cellulose carriers or substrates, it should be noted that substrates formed of other man-made or natural materials such as textiles, e.g., Nylong or cotton fibers or cloth may be made fire resistant by application of a coating of sodium silicate. The sodium silicate also may be applied to the surfaces of particle board or synthetic polymer products to render the particle board or synthetic polymer products fire resistant. Also, the sodium silicate coating need not be applied as a continuous coating, but may be applied, for example, in a striped pattern or as individual dots. In such case, the stripes or dots should be sufficiently closely spaced so that the coverage of the intumescent layer formed upon exposure of the coated article to heat or fire is sufficient to provide the desired fire resistance. Further, if desired, a non-combustible element such as sodium silicate may be positioned between the combustible substrate and the aluminum foil to provide additional heat reflection. Still other changes will be obvious to one skilled in the art. Accordingly, it is intended that all matter contained in the above description or shown in the accompanying drawings should be interpreted in an illustrative and not in a limiting sense.

We claim:

1. In a corrugated laminated cellulose product comprising at least two sheets of cellulose material including at least one liner board and at least one fluted medium sheet affixed to one another by a sodium silicate adhesive, the improvement wherein said sodium silicate is dried-in-place from an aqueous solution, substantially under ambient drying conditions, whereby bound water molecules contained in the sodium silicate are retained, said dried-in-place sodium silicate being present in an amount (dry weight) of at least about three pounds per thousand square feet of laminated product, said dried-in-place sodium silicate being heat-foamable to produce an element capable of retarding the passage of heat or fire therethrough in the event said product is exposed to fire or heat.

2. A laminated product according to claim 1, wherein said sodium silicate is present in an amount of from about three to about sixty pounds per thousand square feet of said laminated product.

3. A laminated product according to claim 1, wherein the foam produced upon exposure to fire or heat is an oxygen denial barrier.

4. A laminated product according to claim 1, wherein the foam produced upon exposure to fire or heat is a heat reradiator.

5. A laminated product according to claim 1, wherein said sodium silicate, upon exposure to heat or fire forms a self-extinguishing char barrier.

6. A laminated product according to claim 1, wherein said sodium slicate also includes at least one inorganic material.

7. A laminated product according to claim 6, wherein said inorganic material is non-reactive with said sodium silicate.

8. A laminated product according to claim 6, wherein said inorganic material is reactive with said sodium silicate to produce a reaction product which is intumescent upon exposure to heat.

9. A laminated product according to claim 6, wherein said inorganic material comprises a metal oxide or salt.

10. A laminated product according to claim 9, wherein said inorganic material is selected from the group consisting of silicon oxide, ferric oxide, titanium oxide, antimony trioxide, antimony pentoxide, and mixtures of one or more of said group.

11. A laminated product according to claim 6, wherein said inorganic material comprises mica.

12. A laminated product according to claim 9, wherein said inorganic material is selected from the group consisting of ferric chloride, aluminum trihydrate, sodium aluminum sulfosilicate, carbon black, graphite, and mixtures of one or more of said group.

13. A laminated product according to claim 6, wherein said sodium silicate also includes at least one material selected from the group consisting of carbon black, graphite, a dye, a wetting agent, a surfactant, a dispersant, a fungicide, a bactericide, an extender, and mixtures of one or more of said group.

14. A laminated product according to claim 1, wherein said sodium silicate is applied to the crests of said fluted medium sheet and substantially completely covering the facing surface of the liner board.

15. A laminated product according to claim 13, and including at least one additional liner boards adhesively affixed by means of said dried-in-place sodium silicate.

16. A laminated product according to claim 1, wherein said laminated product comprises single wall corrugated structure.

17. A laminated product according to claim 15, wherein said laminated product comprises double wall corrugated structure.

18. A laminated product according to claim 15, wherein said laminated board comprises triple wall corrugated structure.

19. A laminated product according to claim 15, wherein said fluted medium comprises a pair of fluted media adhesively affixed to one another by said dried-in-place sodium silicate.

20. A laminated product according to claim 14, wherein said fluted medium comprises opposed broad surfaces, said opposed broad surfaces also being coated with said dried-in-place sodium silicate.

21. A laminated product according to claim 1, wherein said dried-in-place sodium silicate is capable of protecting at least one of said elements in a heat or flame environment up to 40 $KW/M^2$.

22. A laminated product according to claim 21, in the form of a container.

23. A laminated product according to claim 1, and including at least one electromagnetic shielding layer, said at least one electromagnetic shielding layer being adhesively affixed to said laminated product by said dried-in-place sodium silicate.

24. A laminated product according to claim 23, wherein said electromagnetic shielding layer comprises a graphite felt.

25. A laminated product according to claim 5, wherein said combustible sheet, in combination with said sodium silicate, forms said self-extinguishing char barrier.

26. A laminated product according to claim 1, wherein the foam produced upon exposure to fire or heat is a thermal insulator.

27. In a method forming a laminated corrugated cellulose product comprising at least two sheets of cellulose material including at least one liner board and at least one fluted medium sheet, the improvement wherein an aqueous solution of sodium silicate adhesive material is applied to at least one of said sheets in an amount of at least three pounds per thousand square feet of laminated product, and the sheets are placed in pressing relationship under conditions to promote curing of said adhesive, the sodium silicate being dried-in-place, substantially under ambient drying conditions, whereby bound water molecules contained in the sodium silicate are retained.

28. In a method according to claim 27, and including the step of adding to said sodium silicate prior to application thereof to said sheet an inorganic material which is non-reactive with said sodium silicate.

29. In a method according to claim 28, wherein said inorganic material comprises a metal oxide or salt.

30. In a method according to claim 29, wherein said inorganic material is selected from the group consisting of silicon oxide, ferric oxide, titanium oxide, antimony trioxide, antimony pentoxide, and mixtures of one or more of said group.

31. In a method according to claim 28, wherein said inorganic material comprises a material selected from the group consisting of mica, carbon black, graphite, and mixtures of one or more of said group.

32. In a method according to claim 29, wherein said inorganic material is selected from the group consisting of ferric chloride, aluminum trihydrate, sodium aluminum sulfosilicate, and mixtures of one or more of said group.

33. In a method according to claim 27, and including the step of adding to said sodium silicate prior to application thereof to said sheets, an inorganic material which is reactive with said sodium silicate material to produce a reaction product which is intumescent upon exposure to heat.

34. In a method according to claim 27, and including the steps of applying said sodium silicate adhesive to at least the crests of said flutes and substantially completely covering the facing surface of the liner board.

35. In a method according to claim 28, wherein said inorganic material comprises ethylene glycol, said ethylene glycol being applied to either or both of said sheets prior to the application of said sodium silicate.

36. A method of improving the fire resistance of a laminated corrugated cellulose product comprising at least two sheets of cellulose material including at least one liner board and at least one fluted medium sheet affixed to one another by a sodium silicate adhesive applied as an aqueous solution, the improvement wherein said sodium silicate is dried-in-place, substantially under ambient drying conditions, whereby bound water molecules contained in the sodium silicate are retained, said dried-in-place sodium silicate being present in an amount (dry weight) of at least about three pounds per thousand square feet of laminated product, said dried-in-place sodium silicate being heat-foamable to produce a mechanically stable further element capable of resisting the passage of fire therethrough in the event said product is exposed to fire or heat.

37. In a method according to claim 36, wherein said sodium silicate adhesive consists solely of sodium silicate in aqueous solution, said sodium silicate being applied in liquid solution in an amount to provide a dried-in-place weight of sodium silicate of from about three to about sixty pounds per one thousand square feet of laminated product and being dried-in-place at a temperature below about 157° F.

38. A new use of sodium silicate as a combination laminating adhesive and fire resistant barrier for laminated corrugated cellulose products, said sodium silicate being applied to said products from an aqueous solution and dried-in-place, substantially under ambient drying conditions, whereby bound water molecules contained in the sodium silicate are retained, whereby to provide an element present in an amount (dry weight) of at least about three pounds per thousand square feet of laminated product and which is heat-foamable to produce a barrier capable of resisting the passage of heat or fire therethrough in the event said product is exposed to fire or heat.

39. In a method for manufacturing a laminated corrugated cellulose product comprising at least two sheets, wherein said at least one of said sheets comprises a cellulose liner board and at least one other of said sheets comprises a fluted cellulose medium sheet, the improvement wherein said sheets are adhesively fixed to one another by means of a sodium silicate applied from aqueous solution in an amount of at least three pounds per thousand square feet of laminated product and dried-in-place while said sheets are maintained in pressing relationship, the step of drying said sodium silicate in-place occurring substantially under ambient drying conditions, whereby bound water molecules contained in the sodium silicate are retained.

40. In a method according to claim 39, including the steps of (a) forming said fluted medium sheet around a heated fluted roller, (b) cooling said formed fluted medium sheet, and (c) applying said sodium silicate to said cooled fluted medium sheet.

41. A method according to claim 40, wherein said sodium silicate is applied to the crests of said flutes, and substantially completely covering the facing surface of said liner board so as to form a substantially continuous layer of dried-in-place sodium silicate sandwiched between said flutes and said liner board.

42. A method according to claim 39, and including the step of drying said sodium silicate to tack prior to pressing said elements in contact with one another.

* * * * *